(12) United States Patent
Wuest et al.

(10) Patent No.: US 8,944,225 B2
(45) Date of Patent: Feb. 3, 2015

(54) STRUCTURE FOR ABSORBING ENERGY

(75) Inventors: Andreas Wuest, Zwingenberg (DE); Stefan Glaser, Schifferstadt (DE); Daniel Fertig, Lorsch (DE); Torsten Hensel, Bensheim (DE); Uwe Gleiter, Neustadt (DE)

(73) Assignee: BASF SE, Ludwigshafen (DE)

( * ) Notice: Subject to any disclaimer, the term of this patent is extended or adjusted under 35 U.S.C. 154(b) by 206 days.

(21) Appl. No.: 13/057,507

(22) PCT Filed: Aug. 7, 2009

(86) PCT No.: PCT/EP2009/060295
§ 371 (c)(1),
(2), (4) Date: Apr. 26, 2011

(87) PCT Pub. No.: WO2010/015711
PCT Pub. Date: Feb. 11, 2010

(65) Prior Publication Data
US 2011/0193369 A1 Aug. 11, 2011

(30) Foreign Application Priority Data

Aug. 7, 2008 (EP) .................................... 08162025

(51) Int. Cl.
*B60R 19/18* (2006.01)
*F16F 7/12* (2006.01)
*B60R 19/34* (2006.01)

(52) U.S. Cl.
CPC ................ *B60R 19/34* (2013.01); *F16F 7/124* (2013.01)
USPC .............................. 188/371; 188/379; 293/102

(58) Field of Classification Search
CPC ........ B60R 19/02; B60R 19/04; B60R 19/14; B60R 19/18; B60R 19/24; B60R 19/023
USPC .......... 188/371, 377, 379; 293/132, 133, 155, 293/102
See application file for complete search history.

(56) References Cited

U.S. PATENT DOCUMENTS 6,270,131 B1 * 8/2001 Martinez et al. .............. 293/132
6,540,275 B1 4/2003 Iwamoto et al.
(Continued)

FOREIGN PATENT DOCUMENTS

DE 42 09 826 9/1993
DE 102 39 919 2/2004
(Continued)

OTHER PUBLICATIONS

International Search Report issued Sep. 4, 2009 in PCT/EP09/060295 filed Aug. 7, 2009.

*Primary Examiner* — Anna Momper
*Assistant Examiner* — San Aung
(74) *Attorney, Agent, or Firm* — Oblon, Spivak, McClelland, Maier & Neustadt, L.L.P.

(57) ABSTRACT

A structure for absorbing energy from impacts thereon, the structure being plastically deformable by an impact, with, if appropriate, the possibility that it is at least to some extent disrupted. The structure can include a) ribs for reinforcement, the ribs arranged with respect to one another at an angle with respect to the axial direction such that on failure of a rib a force acting on the structure is immediately absorbed axially by another rib, b) ribs running axially, the ribs being in essence corrugated or of zigzag shape, c) at least one rib running axially in a first plane and connected to at least two ribs running axially in a second plane rotated with respect to the first plane. The structure includes, in the direction of impact, at least two layers, each of which has different compressibility properties and different failure properties.

15 Claims, 5 Drawing Sheets

(56) References Cited

U.S. PATENT DOCUMENTS

| | | |
|---|---|---|
| 8,042,847 B2 * | 10/2011 | Garg et al. .................... 293/102 |
| 2002/0063433 A1 | 5/2002 | Gotanda et al. |
| 2003/0218343 A1 * | 11/2003 | Sato et al. .................... 293/155 |
| 2004/0201252 A1 | 10/2004 | Bechtold et al. |

FOREIGN PATENT DOCUMENTS

| | | |
|---|---|---|
| DE | 10 2006 022503 | 11/2007 |
| EP | 1 065 108 | 1/2001 |
| EP | 1 316 409 | 6/2003 |
| EP | 1 398 224 | 3/2004 |
| EP | 1 477 371 | 11/2004 |
| EP | 1 623 881 | 2/2006 |
| EP | 1 927 514 | 6/2008 |
| WO | 2007 147996 | 12/2007 |

* cited by examiner

FIG.5
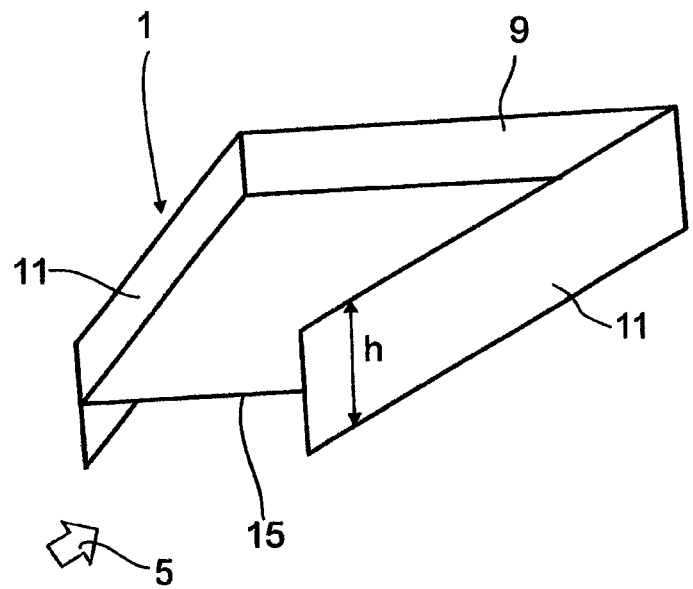
FIG.6.1
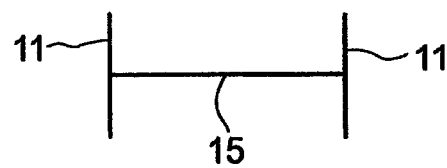
FIG.6.2
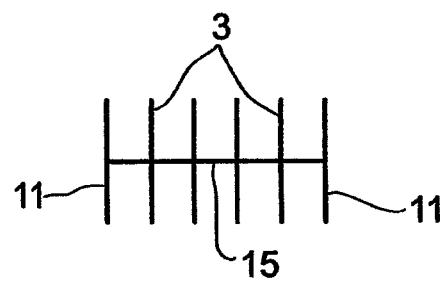

FIG.6.3
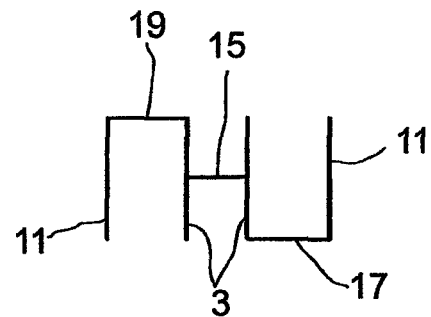
FIG.6.4
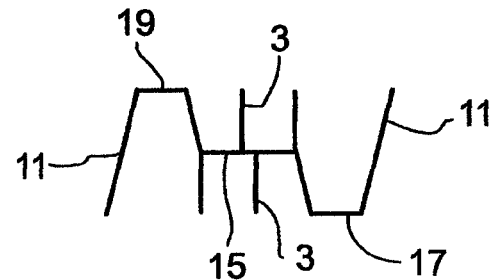
FIG.7
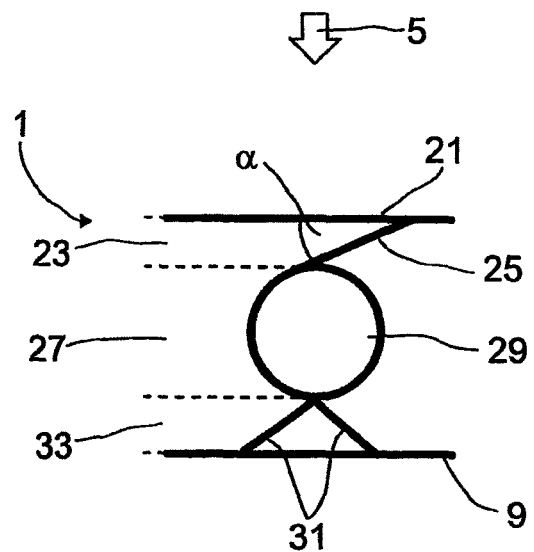

STRUCTURE FOR ABSORBING ENERGY

The invention relates to a structure for absorbing energy from impacts thereon, where the structure is plastically deformable by an impact, with, if appropriate, the possibility that it is at least to some extent disrupted.

Structures for absorbing energy from impacts thereon are used by way of example as what are known as crash absorbers in motor vehicles. The installed location of these is generally between the vehicle fpistone and a bumper crossmember. During an impact, the crash absorbers deform and thus irreversibly absorb energy. Absorption of the energy by disruption of the structure of the crash absorbers can avoid high-cost repairs to structurally important parts of the vehicle, as long as the amounts of energy to be absorbed are only relatively small.

The usual structures used as crash absorbers in vehicles, to absorb energy, are crash boxes composed of steel. Their structure is by way of example as described in EP-A 1 477 371, and is deformed on impact.

However, in the search for fuel saving it is desirable to design vehicle components with low weight. For this reason, alternative materials whose weight is lower than that of steel are also desired for crash boxes. By way of example, WO-A 2007/147996 discloses that crash absorbers can be manufactured from a plastic. The usual method here uses a fiber-reinforced plastic. The absorber structure disclosed comprises two members reinforced with ribs and connected to one another via a plate. Reinforcement here is provided by transverse ribs in the member, and between each two transverse ribs there is a cross-rib structure.

However, a disadvantage of this type of structure is that axial impact produces stepwise absorption, where in each case energy input causes fracture until the next transverse rib is reached, and then energy input is again needed until again sufficient energy has been introduced to disrupt the structure as far as the next transverse rib. This method cannot therefore give controlled or controllable failure of the member.

Particularly suitable components for absorbing relatively large amounts of energy are continuous-fiber-reinforced components, but these are relatively expensive to produce.

In contrast to these, short-glassfiber-reinforced plastics are generally used only as secondary elements with relatively short installed lengths. These are generally designed as combined cylindrical dome structures, or are designed in similar ribbed form, and are also designed only with relatively short installed length, because of the risk of buckling.

It is an object of the present invention to provide a structure which can absorb the energy from impacts thereon and which has been manufactured from a polymer material, where the structure has been designed in such a way that it can provide a uniform rate of absorption of force, through a controllable and controlled failure process.

The object is achieved via a structure for absorbing energy from impacts thereon, where the structure is plastically deformable by an impact, with, if appropriate, the possibility that it is at least to some extent disrupted, wherein at least one of the following features has been provided:
a) the structure has ribs for reinforcement, where the ribs have been arranged with respect to one another at an angle with respect to the axial direction in such a way that on failure of a rib a force acting on the structure is immediately absorbed axially by another rib,
b) the structure has ribs running axially, the ribs being in essence corrugated or of zigzag shape,
c) the structure has at least one rib running axially in a first plane and connected to at least two ribs running axially in a second plane rotated with respect to the first plane,
d) the structure comprises, in the direction of impact, at least two layers, each of which has different compressibility properties and different failure properties.

For the purposes of the present invention, an axial direction is, in the case of an undeformed structure for the absorption of energy, the main direction of action of an impact affecting the structure. This direction is also generally identical with the greatest longitudinal dimension of the structure.

If the structure has ribs arranged at an angle with respect to the axial direction in such a way that on failure of a rib a force acting on the structure is immediately absorbed axially by another rib, the ribs have preferably been rotated at an angle in the range from 10 to 80°, preferably in the range from 45 to 75°, with respect to the axial direction. This makes it possible that, when a force acts axially on the structure, one rib first absorbs a portion of the force until it fails, e.g. through fracture, but at the juncture at which failure of the rib occurs the force acting on the structure can immediately be absorbed by the next rib. The arrangement of the ribs here is such that any cross section perpendicular to the axial direction always intersects at least two ribs.

In addition to the ribs rotated at an angle with respect to the axial direction, there can also be longitudinal ribs provided, running axially. Longitudinal ribs of this type have usually been provided at least at the external sides, in a longitudinal direction.

The fact that the force acting on the structure is already acting on a further rib while the preceding, failing, rib is still at least to some extent in existence can eliminate peaks in the force acting on the structure. The result is a uniform rate of absorption of the force acting on the structure.

Correspondingly, the corrugated or zigzag ribs running axially also lead to a uniform rate of failure of the structure. Ribs running axially and thus in the direction of the impact are generally subjected to purely axial load. The failure profile of these ribs corresponds to Euler buckling, where lateral failure takes place when a critical load is exceeded. This type of design also leads to an undesired sudden change in the force curve. This type of characteristic can be avoided by means of the corrugated shape. This is attributable to the fact that each of the corrugated ribs undergoes further deformation at the top of its corrugations and finally fails and fractures at the top of the corrugation. As soon as the ribs fracture at the top of the corrugation, the force immediately acts on the next oblique portion of the corrugated rib. It is particularly preferable that the corrugated ribs have been designed with a radius at their respective corners where their direction changes. The ribs initially deform at this radius, prior to controlled failure. Zigzag ribs always fracture at the angles. The force acting on the ribs is smaller than in the case of a shape designed with a radius.

By virtue of the radius, even a low level of force induces a controlled flexural load on the ribs. Although this reduces the maximum force that the rib can absorb before failure, it also reduces the high variation in the force curve plotted against time.

If the structure for absorbing energy is subject to an axial impact, for example in the event of an axial crash in a motor vehicle, a characteristic feature is that asymmetries arising produce not only the dominant axial force but also transverse forces. For this reason it is necessary that a structure in essence acting axially to absorb energy also has a certain robustness with respect to transverse forces, in order to provide reliable functioning even when subject to non-ideal stresses.

Such non-ideal stresses occur in particular in motor vehicles by way of example if a crash is not directly axial but, for example, occurs with slight displacement or at a slight angle.

An example of a method of raising robustness with respect to transverse forces acting on the structure is to give the structure at least one rib which runs axially in a first plane and has connection to at least two ribs running axially in a second plane, rotated with respect to the first plane, by way of example, the structure here takes the form of a double-T member. The ribs running in a first plane and the ribs running in a second plane, rotated with respect to the first plane, give the structure particular reinforcement with respect to such transverse forces.

It is by way of example also possible that, in addition to one rib running axially in a first plane, and two ribs running axially in a second plane, rotated with respect to the first plane, as is the case by way of example in a double-T member, there can be two parallel ribs provided in the first plane, each of which has connection to two ribs running axially in a second plane, rotated with respect to the first plane. All other forms are also possible. By way of example, it is also possible to use more than two ribs in each direction.

By virtue of the structure comprising at least two layers in the direction of impact, each layer having different compressibility properties and different failure behavior, it is possible that by way of example one layer first fails at a relatively low force level, and then that one layer fails at a somewhat higher force level. In the case of more than two layers, it is preferable that each layer fails at a somewhat higher force level than the preceding layer. This leads to controlled absorption of the force acting on the structure as a result of the impact, where the force needed to cause failure of a layer becomes ever greater and the result of this is that the rate at which the structure is compressed as a result of failure decreases as the length is progressively reduced by the failure. The result of this by way of example in the case of a crash in a motor vehicle is a continuous decrease in the speed of movement of the motor vehicle.

In one preferred embodiment, the ribs have been designed with axially increasing height. It is preferable here that the height of the ribs increases in the direction of their fastening point and thus in the direction of impact in the case of an impact acting axially. The increase in the height of the ribs is a response to the distribution of bending moment arising from transverse forces. For example, the bending moment of the side facing away from the side on which the impact acts is greater than directly at the point of action of the impact. It is also possible, as an alternative, that the width of the profile increases while the height of the ribs remains the same. Again, this is a response to the distribution of bending moment when transverse forces are present. In another alternative, the dimensions of the structure increase axially. If the dimensions of the structure increase in an axial direction, the dimensions increase not only in terms of height but also in terms of width. Another alternative possibility is that the wall thickness of the ribs increases in an axial direction, the ribs on the side facing toward the point of action of the impact having the lowest wall thickness. It is also possible to realize any desired combination of the geometry changes described above, i.e. the increase in the height of the ribs, the increase in the width of the profile, the increase in the dimensions of the structure in an axial direction, and the increase of the wall thickness of the ribs.

If the structure has at least one rib running axially in a first plane and connected to at least two ribs running axially in a second plane, rotated with respect to the first plane, another possible design, alongside the design in the form of a double-T member, is by way of example a design in which the structure comprises at least two ribs running axially in mutually parallel planes, each connected to two ribs running in a plane rotated with respect thereto. The ribs running in two parallel planes here can run directly parallel or have displacements such that these ribs running in mutually parallel planes have been connected at different sides to a rib running in the plane rotated with respect thereto. By way of example, it is possible here that two adjacent ribs have connection at the upper side and that two other adjacent ribs have connection at their lower side through the ribs situated in parallel planes. It is possible here, for example, that in the case of three parallel ribs, two ribs have connection at their upper edge to a rib running in a plane situated perpendicularly thereto, and that the middle rib and the other outer rib of the three parallel ribs have connection at their lower side to the rib running in the rotated plane. In the case of four parallel ribs, where two have connection at their upper side, and two at their lower side, to the rib running in a plane rotated with respect thereto, it is possible by way of example that the two middle ribs have connection to one another through a rib running in another parallel plane situated between the upper and the lower plane. There could moreover by way of example also be other ribs extending from the ribs and running perpendicularly thereto.

Another possibility, alongside parallel ribs connected through the ribs running in the plane rotated with respect thereto, is that the ribs connected to the ribs running in parallel planes run by way of example in an inclined plane. The angle between the rib running in the first plane and a rib running in a second plane rotated with respect thereto is then by way of example greater than or smaller than 90°.

These cross-sectional forms in which ribs run in at least two planes rotated axially with respect to one another lead in each case to an improvement in the absorption of transverse forces.

The material from which the structure for absorbing energy has been manufactured preferably comprises a polymer material. The polymer material is by way of example a thermoplastic or a thermoset. These can be used in filled or unfilled form. However, it is preferable to use filled polymers.

Examples of suitable polymers are natural and synthetic polymers or their derivatives, natural resins, and synthetic resins and their derivatives, proteins, cellulose derivatives, and the like. These can be—but do not have to be—materials which cure chemically or physically, for example materials which harden in air, or which cure with radiation, or which cure with heat.

It is possible to use not only homopolymers but also copolymers or polymer mixtures.

Preferred polymers are ABS (acrylonitrile-butadiene-styrene); ASA (acrylonitrile-styrene-acrylate); acrylated acrylates; alkyd resins; alkylene-vinyl acetates; alkylene-vinyl acetate copolymers, in particular methylene-vinyl acetate, ethylene-vinyl acetate, butylene-vinyl acetate; alkylene-vinyl chloride copolymers; amino resins; aldehyde resins and ketone resins; cellulose and cellulose derivatives, in particular hydroxyalkylcellulose, cellulose esters, such as cellulose acetates, cellulose propionates, cellulose butyrates, carboxyalkylcelluloses, cellulose nitrates; epoxy acrylates; epoxide resins; modified epoxide resins, e.g. bifunctional or polyfunctional bisphenol A or bisphenol F resins, epoxy-novolak resins, brominated epoxy resins, cycloaliphatic epoxy resins; aliphatic epoxy resins, glycidic ethers, vinyl ethers, ethyleneacrylic acid copolymers; hydrocarbon resins; MABS (transparent ABS comprising acrylate units); melamine resins; maleic anhydride copolymers; (meth)acrylates; natural resins; rosins; shellac; phenolic resins; polyesters; polyester resins, such as phenyl ester resins; polysulfones (PSU); polyether sulfones (PESU); polyphenylene sulfone (PPSU); polyamides; polyimides; polyanilines; polypyrroles; polybutylene terephthalate (PBT); polycarbonates (e.g. Makrolon® from Bayer AG); polyester acrylates; polyether acrylates; polyethylene; polyethylenethiophenes; polyethylene naphthalates; polyethylene terephthalate (PET); polyethylene terephthalate glycol (PETG); polypropylene; polymethyl methacrylate (PMMA); polyphenylene oxide (PPO); polyoxymethylene (POM); polystyrenes (PS), polytetrafluoroethylene (PTFE); polytetrahydrofuran; polyethers (e.g. polyethylene glycol, polypropylene glycol); polyvinyl compounds, in particular polyvinyl chloride (PVC), PVC copolymers, PVdC, polyvinyl acetate, and copolymers of these, and if appropriate partially hydrolyzed polyvinyl alcohol, polyvinyl acetals, polyvinyl acetates, polyvinylpyrrolidone, polyvinyl ethers, polyvinyl acrylates and polyvinyl methacrylates, in solution and in the form of dispersion, and copolymers of these, polyacrylates and polystyrene copolymers; polystyrene (impact-resistant or non-impact-resistant); polyurethanes, non-crosslinked or crosslinked with isocyanates; polyurethane acrylates; styrene-acrylonitrile (SAN), styrene-acrylic copolymers; styrene-butadiene block copolymers (e.g. Styroflex® or Styrolux® from BASF SE, K-Resin™ from TPC); proteins, e.g. casein; SIS; triacin resin, bismaleimide-triacin resin (BT), cyanate ester resin (CE), allylated polyphenylene ether (APPE). Mixtures of two or more polymers can also be used.

Polymers particularly preferred are acrylates, acrylate resins, cellulose derivatives, methacrylates, methacrylate resins, melamine and amino resins, polyalkylenes, polyimides, epoxy resins, modified epoxy resins, e.g. bifunctional or polyfunctional bisphenol A resins or bifunctional or polyfunctional bisphenol F resins, epoxy-novolac resins, brominated epoxy resins, cycloaliphatic epoxy resins, aliphatic epoxy resins, glycidic ethers, cyanate esters, vinyl ethers, phenolic resins, polyimides, melamine resins and amino resins, polyurethanes, polyesters, polyvinyl acetals, polyvinyl acetates, polystyrenes, polystyrene copolymers, polystyrene-acrylates, styrene-butadiene block copolymers, styrene-acrylonitrile copolymers, acrylonitrile-butadiene-styrene, acrylonitrile-styrene-acrylate, polyoxymethylene, polysulfones, polyether sulfones, polyphenylene sulfone, polybutylene terephthalate, polycarbonates, alkylene-vinyl acetates and vinyl chloride copolymers, polyamides, cellulose derivatives and copolymers of these, and mixtures of two or more of these polymers.

Polymers particularly preferred are polyamides, such as nylon-4,6, nylon-6, nylon-11, nylon-6,6, nylon-6/6, nylon-6/10, or nylon-6/12, polypropylene, polyethylene, styrene-acrylonitrile copolymers, acrylonitrile-butadiene-styrene, acrylonitrile-styrene-acrylate, polyoxymethylene, polysulfones, polyether sulfones, polyphenylene sulfones, polybutylene terephthalate, polycarbonates, and mixtures of these.

The polymer material is preferably a reinforced material. In particular, the polymer material is fiber-reinforced. Any known fibers conventionally used for reinforcement and known to the person skilled in the art can be used for this reinforcement. Examples of suitable fibers are glass fibers, carbon fibers, apistonid fibers, boron fibers, metal fibers, and potassium titanate fibers. The fibers can be used in the form of short fibers or of long fibers. The fibers can also be present in ordered or unordered form in the polymer material. In particular when long fibers are used, however, an ordered arrangement is usual. The fibers here can by way of example be used in the form of individual fibers, fiber strands, mats, wovens, knits, or rovings. If the fibers are used in the form of long fibers, or as rovings or as fiber mat, the fibers are usually placed in a mold, the polymer material then being poured around them. The resultant structure can have one or more layers. In the case of a structure having more than one layer, the fibers of each of the individual layers can have the same orientation, or the fibers of the individual layers can be at an angle of from −90° to +90° to one another.

However, it is preferable to use short fibers. When short fibers are used, these are usually admixed with the polymer composition prior to hardening. The main body of the structure can by way of example be manufactured via extrusion, injection molding, or casting. It is preferable that the main body of the structure is manufactured by injection molding or casting. The short fibers are generally in unoriented form in the structure. However, if the structure is produced via an injection-molding process, orientation of the short fibers can result when the polymer composition comprising the fibers is forced through an injection nozzle into the mold.

Suitable reinforcing agents are not only fibers but also any desired other fillers which are known to the person skilled in the art and which act to increase stiffness and/or to increase strength. Among these are inter alia any desired particles with no preferential orientation. Particles of this type are generally spherical, lamellar, or cylindrical. The actual shape of the particles here can deviate from the idealized shape. In particular, therefore, spherical particles can actually by way of example also have a droplet shape or a flattened shape.

Examples of reinforcing materials used, besides fibers, are graphite, chalk, talc and nanoscale fillers.

However, it is particularly preferable to use glass fibers for reinforcement. Glassfiber-reinforced polyamides are particularly preferred as material for production of the structure for absorbing energy.

Production of the structure for absorbing energy can use not only polymer materials but also metals, which can be shaped via casting processes. Suitable materials are therefore by way of example low-density metals that are processible via diecasting processes, examples being aluminum and magnesium. However, it is also possible to use ferrous metals, such as steel or cast iron, where these can be processed via casting processes.

So that the impact acting on the structure is introduced at a uniform rate, it is preferable that, on the side on which the impact acts upon the structure there is a piston which at least covers the cross section of the structure. However, the cross-sectional area of the piston can also by way of example be greater than the cross section of the structure. This piston is preferably manufactured from a stiff material, so that a force acting on the piston at any desired position is uniformly distributed over the structure for absorbing energy. Examples of suitable materials from which the piston has been manufactured are the same as the materials also suitable for production of the structure for absorbing energy. The piston here can have been manufactured from material which is the same as that used for the structure, or else from material differing from the material of the structure.

As a function of the cross-sectional area of the structure for absorbing energy, the piston can assume any desired cross section. It is preferable, however, that the piston takes the form of a parallelepiped, cylinder, or prism, with any desired cross section. However, the cross section can remain constant in an axial direction or else the cross-sectional area of the piston can by way of example increase or decrease in an axial direction. It is therefore also possible, for example, that the piston takes the form of a frustum of a cone or of a pypistonid.

In particular, the material used to manufacture the piston is the same as that used to manufacture the structure for absorbing energy.

The arrangement can have the piston at various positions in the component. It is therefore possible by way of example that the arrangement is such that the piston does not act as a piston until a certain load has arisen. To this end, by way of example, there is a deformable-structure region in an axial direction not only in front of the piston but also behind the piston. However, the general situation is that, in the arrangement, the structure absorbing energy is present only on that side of the piston facing away from the side on which the impact acts. Although the piston and the structure for absorbing energy represent two separate components, it is possible—in particular when the same material is used—that both components are produced together in a single shot in an injection-molding process.

The drawings show embodiments of the invention and are explained in more detail in the description which follows.

FIG. 5 shows a three-dimensional representation of a structure for absorbing impacts with ribs running in planes rotated with respect to one another, with increasing rib width.

FIGS. 6.1 to 6.4 respectively show a cross section of various embodiments with ribs running in planes rotated with respect to one another.

FIG. 7 shows a plan view of a diagpiston of a structure with three layers and different compressibility properties.

Figure 8:
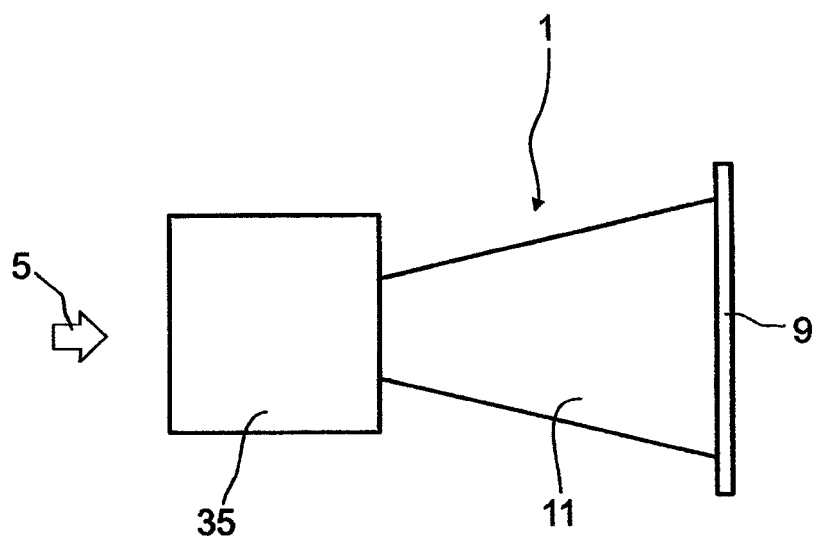

FIG. 8 shows a side view of a structure of the invention, with piston.

Figure 1:
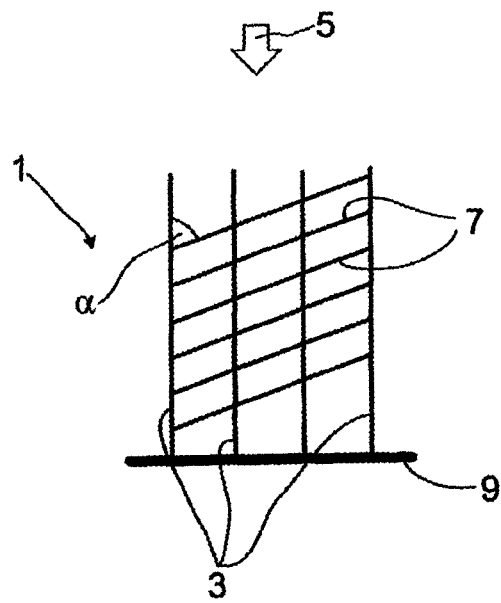
FIG. 1 shows a plan view of a diagpiston of a first embodiment of a structure for absorbing impacts.

FIG. 1 shows a plan view of a diagpiston of a first embodiment of a structure for absorbing impacts.

A structure 1 designed according to the invention for absorbing energy from impacts thereon comprises longitudinal ribs 3. The longitudinal ribs 3 have axial orientation, and axial direction here corresponds to the main direction of action of an impact. The arrow 5 shows the direction of the impact acting on the structure 1. In order to achieve a uniform rate of absorption of energy from the impact, the longitudinal ribs 3 have been connected to transverse ribs 7. The transverse ribs 7 here run at an angle $\alpha$ with respect to the longitudinal ribs 3, the angle being smaller than 90°. The angle $\alpha$ is preferably selected in such a way that a plane perpendicular to the direction 5 of impact always intersects at least two transverse ribs 7. When one rib fails, therefore, the force acting thereon and due to the impact 5 immediately acts on the rib which follows the rib that is failing. A uniform rate of absorption of energy is thus achieved.

On the side opposite to the side on which the impact 5 acts, there is generally a support 9 to which the structure has been secured. The support 9 usually runs in a plane perpendicular to the direction 5 of impact. However, it is also possible that the support 9 runs in the direction 5 of impact or at any desired other angle with respect thereto.

Figure 2:
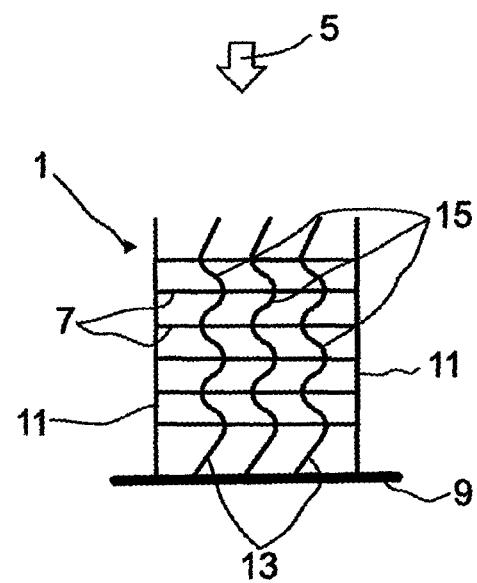
FIG. 2 shows a plan view of a diagpiston of a second embodiment of a structure for absorbing impacts.

FIG. 2 shows a plan view of a second embodiment of a structure for absorbing impacts.

The embodiment shown in FIG. 2 differs from the embodiment shown in FIG. 1 in that the transverse ribs 7 run in essence in a plane transverse to the direction 5 of impact, therefore having been oriented parallel to the support 9. Two longitudinal ribs 11 run in the direction 5 of impact, and respectively form the outer sides of the structure 1. The structure 1 shown in FIG. 2 moreover comprises corrugated ribs 13 oriented axially. The corrugated structure of the ribs 13 gives these a shape which leads to controlled failure. As a result of the impact 5, the corrugated ribs 13 initially become deformed on the side where the impact acts. The corrugated rib 13 initially bends in the region of the top 15 of a corrugation, which is usually in the path of a transverse rib 7, and this continues until the bending produces failure through fracture of the corrugated rib. When fracture occurs, the energy of the impact 5 immediately acts on the next region of the corrugated rib 13 as far as the next top 15 of a corrugation. This method likewise achieves a uniform rate of failure of the structure through a uniform rate of axial compression.

Figure 3:
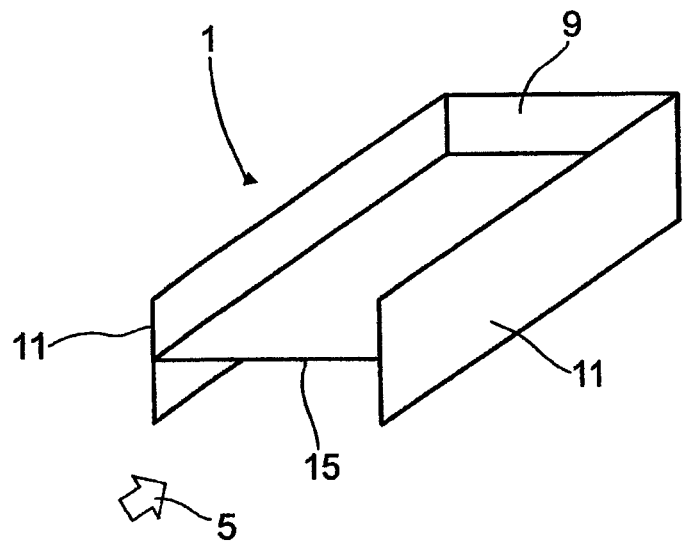
FIG. 3 shows a three-dimensional representation of a first embodiment of a structure for absorbing impacts with ribs which run in planes rotated with respect to one another.

FIG. 3 shows a first embodiment of a structure which also absorbs transverse forces acting on the structure 1. In this case, the structure 1 has been shown three-dimensionally. Unlike the structures of FIG. 1 and FIG. 2, the structure 1 shown in FIG. 3 comprises two outer longitudinal ribs 11, running axially in a first plane. Axial direction in this case again means the main direction 5 of impact. The structure 1 as shown in FIG. 3 comprises not only the longitudinal ribs 11 running axially in a first plane but also a rib 15 running axially in a second plane, rotated with respect to the first plane. The design, and the manner in which the ribs 11 and 15 run gives a cross section in the form of a double-T member. By virtue of the ribs running in planes rotated with respect to one another, this member is also stable with respect to flexural stress of the type that can be produced by transverse forces.

Figure 4:
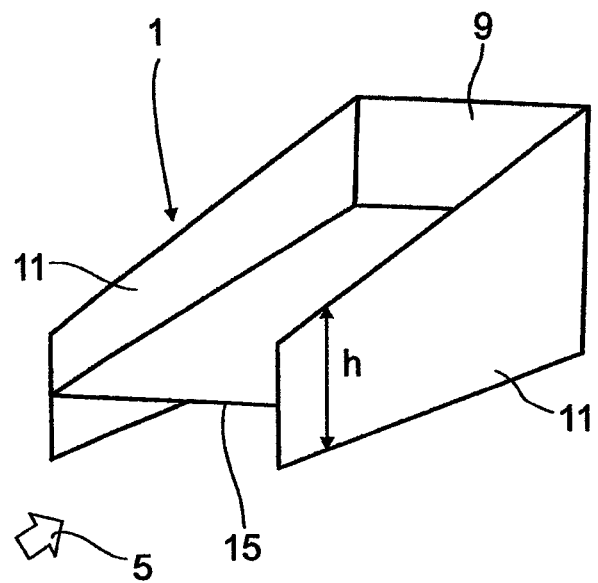
FIG. 4 shows a three-dimensional representation of a structure for absorbing impacts with ribs running in planes rotated with respect to one another, with increasing rib height.

The embodiment shown in FIG. 4 differs from the embodiment shown in FIG. 3 in that the height h of the longitudinal ribs 11 which laterally delimit the structure 1 increases from the side of action of the impact 5 toward the support 9. The increasing height is a response to the bending moment curve produced by transverse forces.

As an alternative to the embodiment shown in FIG. 4, another possibility is to design the rib 15 running in the second plane with increasing width, while the height h of the longitudinal ribs 11 is constant. The width of the structure 1 thus increases from the side of action of the impact toward the support 9. Another possibility is to design the structure 1 not only with increasing width as shown in FIG. 5 but also with increasing height of the longitudinal ribs 11, as shown in FIG. 4. This type of design provides stability with respect to transverse forces acting either from above or below, or else laterally on the structure 1.

FIGS. 6.1 to 6.4 show cross sections of various embodiments with ribs running in planes rotated with respect to one another. FIG. 6.1 here shows a cross section corresponding to the embodiments shown in FIGS. 3 to 5. This has two longitudinal ribs 11 connected to a rib 15 running in a second plane rotated with respect to the plane in which the longitudinal ribs 11 run. The rib 15 running in the second plane here has been connected to the longitudinal ribs 11 centrally, and these therefore have sections protruding above and below the rib 15.

The embodiment shown in FIG. 6.2 differs from the embodiment shown in FIG. 6.1 in that, alongside the delimiting longitudinal ribs 11, other longitudinal ribs have been provided which respectively protrude above and below the rib 15 running in the second plane and are parallel to the delimiting longitudinal ribs 11. If, as shown in FIG. 4, the longitudinal ribs 11 have increasing height h, it is preferable in the embodiment shown in FIG. 6.2 that the longitudinal ribs 3 between the delimiting longitudinal ribs 11 also have increasing height h. If the structure has increasing width as shown in FIG. 5, the orientation of the longitudinal ribs 3 arranged between the delimiting longitudinal ribs 11 is preferably such that the distances between the individual longitudinal ribs 3 and 11 increase at a uniform rate from the area of action of the impact 5 toward the support 9.

Another possibility, alongside a continuous rib 15, is connection, as shown in FIG. 6.3, of the longitudinal ribs 3 and 11 to the ribs 15, 17, and 19 running in planes rotated with respect to the longitudinal ribs 3 and 11, where the connection between the ribs 15, 17, and 19 and the longitudinal ribs 3 and 11 is respectively at a different height. In the embodiment shown in FIG. 6.3, therefore, a first rib 17 running in the second plane connects one delimiting longitudinal rib 11 to a longitudinal rib 3 along the underside of the ribs 3 and 11, and one rib 15 running in a second plane connects two longitudinal ribs 3 to one another, and a third rib 19 connects a longitudinal rib 3 to the second delimiting longitudinal rib 11 at the upper side of the ribs 3 and 11.

FIG. 6.4 shows an alternative to the embodiment shown in FIG. 6.3. In this embodiment, the delimiting longitudinal ribs 11 do not run in a plane rotated by 90° with respect to the rib 15, 17, and 19, but instead run at an angle greater than 90°, the result therefore being a trapezoidal shape. One of the effects of the trapezoidal shape is to facilitate the demolding of the structure 1 from an injection mold. Additional longitudinal ribs 3 extending above and below the rib 15 running in the central plane provide further reinforcement.

Besides the cross-sectional shapes shown in FIGS. 6.1 to 6.4, any desired other cross section for a rib structure in which ribs 3, 11, 15, 17, and 19 run in planes rotated with respect to one another is also conceivable.

FIG. 7 shows by way of example a plan view of a diagpiston of a structure with three layers with different compressibility properties. By virtue of the different compressibility properties, the force that has to act on each of the layers to produce failure of the individual layers is different. The structure comprises a support 9, to which the structure has been secured, and an area 21 on which an impact 5 acts. In the embodiment shown here, the structure 1 comprises three layers. In a first layer 23, there is a first rib 25 at an angle α with respect to a plane transverse to the direction 5 of impact. When an impact acts on the area 21, this moves toward the support 9. This deforms the rib 25 until its orientation is parallel to the area 21. It is possible here that the rib 25 by way of example fractures at a site of connection to the area 21 or at a site of connection to a second layer 27. Another possibility is that the rib 25 fractures at any desired site between these. In the embodiment shown here, the second layer 27 has been designed as a curved profile, in this case a circular profile. Once the first layer 23 has failed, the force acts by way of the area 21 on the second layer 27. The second layer 27, in this case the circular profile 29, is initially deformed by compression until fracture causes it to fail. The circular profile 29 of the second layer 27 is in contact with ribs 31 of a third layer 33. The ribs 31 here have been designed in such a way that the force needed for failure of the ribs 31 is greater than the force required for failure of the rib 25 or of the structure 29. This is achieved by way of example as shown in FIG. 7 in that the ribs 31 meet at an angle. The ribs 31 thus support one another during action of an impact in the direction 5 of impact.

However, besides the structure shown in FIG. 7, any other desired structure of the layers 23, 27, and 33 where each of the individual layers 23, 27 and 33 has different compressibility properties is also conceivable. Another possibility, therefore, is that different compressibility properties are achieved by placing the ribs more closely together and thus providing more ribs. The ribs run here by way of example as in the embodiments shown in FIG. 1 or 2 or else as in embodiments of FIGS. 3 to 6.4.

FIG. 8 shows a side view of a structure 1 with a piston. The structure shown in FIG. 8 comprises laterally delimiting longitudinal ribs 11, designed with increasing height, as in the embodiment of FIG. 4. However, any desired other structure that accords with the embodiments of FIGS. 1 to 7 is also possible. The structure 1 has been secured to a support 9. A piston 35 has been attached on the side on which an impact 5 acts on the structure 1. The piston 35 transfers the energy of the impact 5 at a uniform rate into the structure 1. The piston 35 here is by way of example a solid parallelepiped, or cylinder, or a solid prism, with any desired cross section. Another possibility is that by way of example a frustum of a cone or of a pypistonid is used as piston 35. The piston 35 has been manufactured from a material which is not deformed by action of the impact 5. Absorption of energy from the impact takes place exclusively in the structure 1. The material for the piston 35 is by way of example the same as the material for the structure 1.

In another possible alternative, the piston 35 is by way of example manufactured from a material different from that of the structure 1. If the structure 1 has been manufactured from a plastic, it is possible by way of example to form the piston 35 from a metal or from a cepistonic. However, it is preferable that the same material is used to manufacture the piston 35 and the structure 1.

The invention claimed is:

1. A structure for absorbing energy from impacts thereon, the structure being plastically deformable by an impact, with a possibility that the structure is at least to some extent disrupted, the structure comprising:
    a) first ribs for reinforcement, the first ribs being arranged with respect to one another at an angle with respect to an axial direction such that, on failure of one of the first ribs, a force acting on the structure is immediately absorbed axially by another of the first ribs;
    b) second ribs running axially, the second ribs being of corrugated shape or of zigzag shape; and
    c) at least one third rib running axially in a first plane and connected to at least two fourth ribs running axially in a second plane that is rotated with respect to the first plane, wherein the first, second, third and fourth ribs are different from each other, or wherein the first, second and third ribs are different from each other.

2. The structure according to claim 1, wherein the fourth ribs have axially increasing height.

3. The structure according to claim 1, wherein dimensions of the structure increase axially.

4. The structure according to claim 1, wherein the third rib running axially in the first plane is connected to the at least two fourth ribs running axially in the second plane such that the fourth ribs running axially in the second plane protrude above and below the at least one third rib running axially in the first plane.

5. The structure according to claim 1, which comprises at least two third ribs running axially in mutually parallel first planes, where the at least two third ribs running in mutually parallel first planes are connected to, respectively, two fourth ribs running in a second plane rotated with respect thereto.

6. The structure according to claim 5, wherein, respectively, two third ribs running in mutually parallel first planes are connected at different sides to a fourth rib running in the second plane rotated with respect thereto.

7. The structure according to claim 1, manufactured from a polymer material.

8. The structure according to claim 7, wherein the polymer material is reinforced.

9. The structure according to claim 8, wherein the polymer material comprises short fibers for reinforcement.

10. The structure according to claim 9, wherein the short fibers are glass fibers, carbon fibers, apistonid fibers, boron fibers, metal fibers, or potassium titanate fibers.

11. The structure according to claim 1, wherein, on a side on which the impact acts on the structure, further comprising a piston that at least covers the cross section of the structure.

12. The structure according to claim 11, wherein the piston is a polymer material or a metal.

13. The structure according to claim 12, wherein the piston and the structure are of a same material.

14. The structure according to claim 11, wherein the piston is a parallelepiped, a cylinder, or a prism.

15. The structure according to claim 1, wherein the structure further comprises, in a direction of impact, at least two layers, each of which has different compressibility properties and different failure properties.

* * * * *